Feb. 5, 1952 F. P. MAUSER 2,584,601
ALPHABET AND NUMERAL TEACHING GUIDE
Filed Sept. 2, 1949 2 SHEETS—SHEET 1
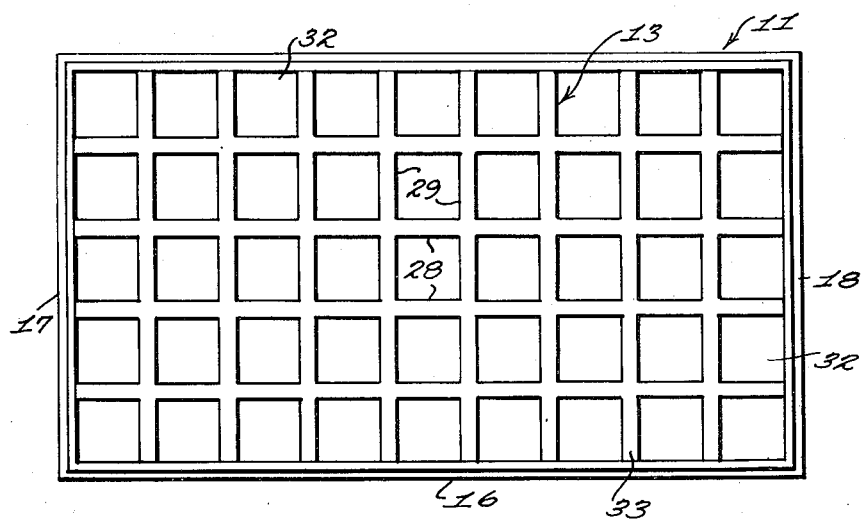
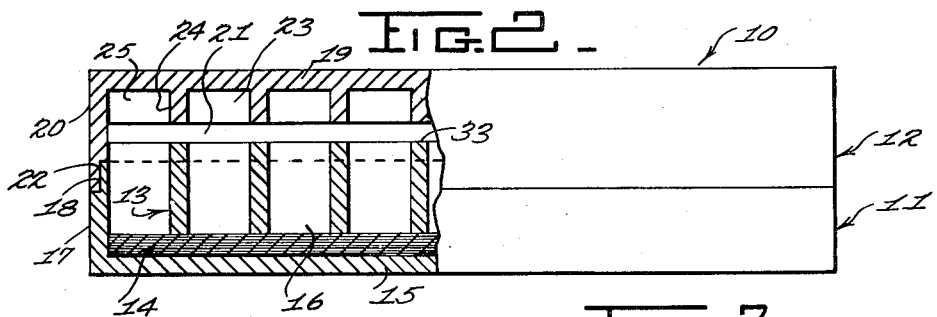
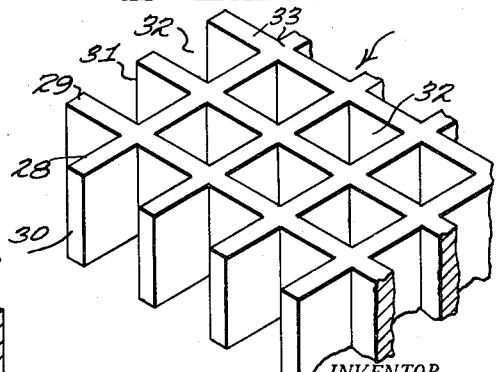
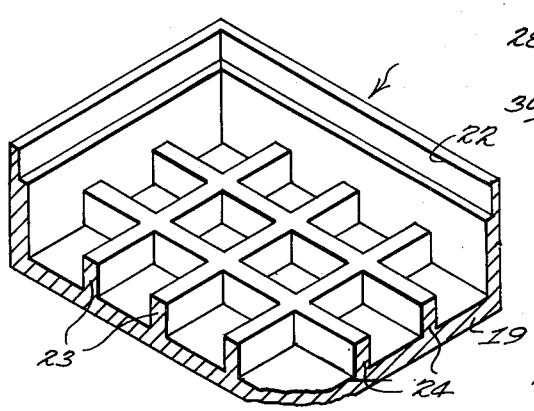
INVENTOR.
FRANCIS P. MAUSER
BY
ATTORNEYS Feb. 5, 1952     F. P. MAUSER     2,584,601
ALPHABET AND NUMERAL TEACHING GUIDE
Filed Sept. 2, 1949     2 SHEETS—SHEET 2
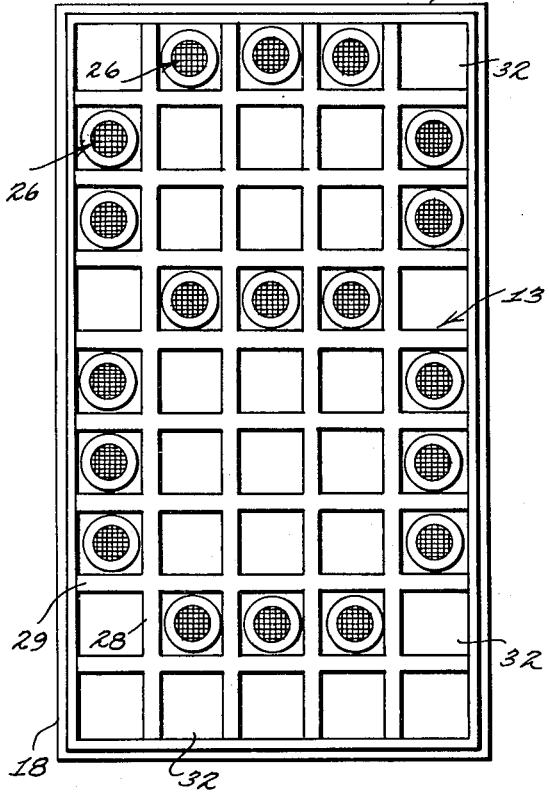
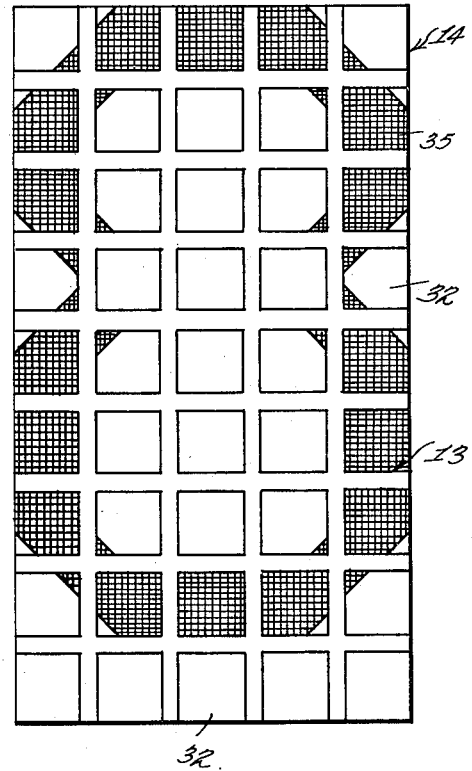
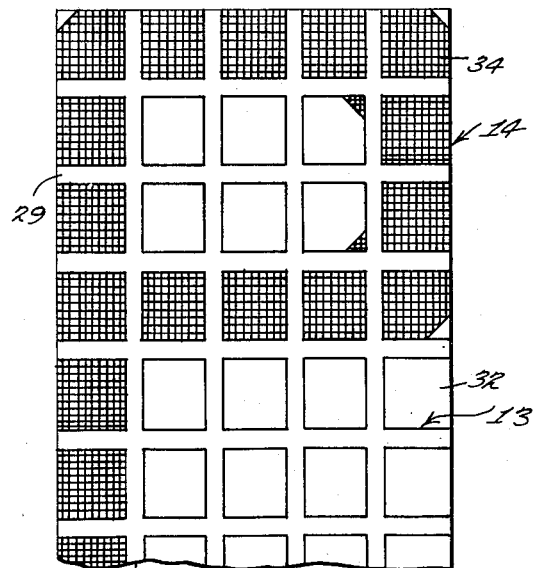
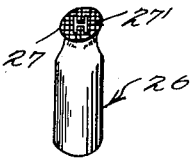
INVENTOR.
FRANCIS P. MAUSER
BY
ATTORNEYS

Patented Feb. 5, 1952

2,584,601

UNITED STATES PATENT OFFICE 2,584,601

ALPHABET- AND NUMERAL-TEACHING GUIDE

Francis P. Mauser, Parkersburg, W. Va.

Application September 2, 1949, Serial No. 113,702

1 Claim. (Cl. 35—73)

This invention relates to apparatus facilitating the learning by children and others of the letters of the alphabet and the numerals from one to zero, the primary object of the invention being to provide a simple, compact and readily portable device of this character involving actual reproduction by the pupil of the letter or numeral being learned by selectively transferring pieces from a container into a compartmented form and placing the pieces in compartments thereof so as to outline the letter or numeral, with or without the guidance of an underlying guide sheet containing an outline of the letter or numeral.

Other important objects and advantageous features of the invention will be apparent from the following description and accompanying drawings, wherein, for present purposes of illustration only, a specific embodiment of the invention is set forth in detail.

In the drawings:

Figure 1 is a top plan view of the box of the device with its compartmented member or grid in position therein;

Figure 2 is a side elevation of the device, partly broken away, to show the internal structure;

Figure 3 is a fragmentary perspective view of the compartmented member or grid;

Figure 4 is a fragmentary bottom perspective view of the cover;

Figure 5 is a top plan view of the box, the cover being removed, with a guide sheet absent from the box beneath the compartmented member or grid, and some pieces in place to form the numeral 8;

Figure 6 is a top plan view of a guide sheet having a numeral 8 pattern thereon;

Figure 7 is a fragmentary top plan view showing a guide sheet for the letter "P" in place beneath the compartmented member or grid;

Figure 8 is a top perspective view of one of the pieces.

Referring to the drawings in detail, wherein like numerals designate like parts throughout the several views, the numeral 10 designates the illustrated device as a whole, consisting of an open top, shallow, rectangular box or receptacle 11, a similarly shallow and similarly rectangular cover or top 12, a compartmented member or grid 13 fitting in the box 11, and a stack of eighteen guide sheets 14 fitting the box 11.

The box 11 comprises the plane bottom 15 from which the side walls 16 and end walls 17 rise, whose outer corners are chamfered, as indicated at 18.

The cover or top 12 comprises the plane top 19, the end walls 20, and side walls 21 depending therefrom with the inner corners thereof chamfered, as indicated at 22, to mate with the chamfers 18 of the box 11 and connect the cover and box together in the closed position of the cover. The cover 12 has secured thereon longitudinal strips 23 and cross-strips 24 spaced relative to each other and to the cover, side walls and end walls to define shallow compartments 25 acting as holders or receptacles for the storage of pieces 26.

The pieces 26 are in the form of miniature milk bottles, having flat tops 27 on each of which is outlined one of the letters of the alphabet or one of the numerals from one to zero, as indicated at 27', there being thirty-six of the pieces.

The removable compartmented member or grid 13 comprises longitudinal walls 28 and transverse walls 29, these walls being spaced from each other and from their outer ends 30 and 31, respectively, at uniform distances, so as to define square compartments 32. There are four longitudinal walls 28 and eight transverse walls 29, which, when the grid is removably placed on the bottom 15 of the box 11, form with each other and the side walls 16 and end walls 17 forty-five compartments 32. The grid walls 28 and 29 are rigidly connected in intersecting relation and, when the grid is in place on the bottom 15 of the box 11, the upper edges 33 of these walls are spaced below the upper edge of the box, or, when the stack of eighteen sheets 14 is in storage in the bottom of the box 11, the upper edges 33 of the grid are above the upper edge of the box 11, as shown in Figure 2.

Each of guide sheets 14 has on either side thereof a shaded or otherwise suitably executed pattern 34 of a letter of the alphabet or a pattern 35 of a numeral from one to zero.

To use the device, the cover 12 is removed from box 11 and inverted and pieces 26 dumped from box 11 into the cover. The grid 13 is then removed from box 11 and the stack of guide sheets 14 removed and a selected one of the sheets placed on the bottom of the box and the grid 13 returned to place in the box. The pattern, either the pattern 34 or the pattern 35 on the sheet 14 then shows in the compartments 32, as shown in Figures 6 and 7. The pupil is then told the name of the letter or numeral and instructed to place pieces 26 in the compartments to cover the pattern, and thereby form the letter or numeral, so that in so doing the pupil learns the form and outline of the letter or numeral, as well as the name thereof. When the pupil has attained proficiency, the use of the guide sheets 14 may be dispensed with. The letters 27' on the tops of the pieces 26 can be used as a visual guide or reference when the underlying guide sheets are not being used.

As may be noted from either Figure 6 or Figure 7, the pattern of the guide sheet is made up of areas contrasting in shade and arranged to form a single readable character, which may be either a letter or a number. This single character is visible through and extends under a substantial number of the several grid compartments, so that the character is formed into a number of portions, each of which is visible through a compartment of the grid. Some of these portions, as will be seen from either Figure 6 or Figure 7, fill more than half of the compartments through which they are visible. The remaining portions fill less than half of the compartments through which they are visible. As a result, the pupil is required to exercise discretion in choosing the particular compartments in which a piece 26 is to be placed, and must ignore those compartments in which less than half of a character portion is seen, while choosing those compartments in which more than half of a character portion is seen. This has value, in that while the pupil is learning letters or numbers, he is also learning to estimate relative sizes, and is required to exercise his reasoning powers in choosing the compartments to a greater extent than he would if those compartments in which a piece is to be placed were completely dark, with the remaining compartments being left completely light.

I claim:

A teaching guide comprising a shallow receptacle open at its top, a guide sheet having a pattern on one face thereof positioned within said receptacle so that the pattern face faces upwardly and rests upon the bottom of said receptacle, and a grid of a configuration the same as that of the said sheet removably supported on the pattern face of said sheet, said grid being formed of a series of intersecting walls forming a series of compartments each open at the top and bottom the pattern of the guide sheet being made up of areas contrasting in shade and arranged to form a single readable character visible through and extending under a plurality of the several compartments of the grid, some portions of said character filling more than half and the remaining portions of the character filling less than half of the bottom areas of the compartments through which they are respectively visible.

FRANCIS P. MAUSER.

REFERENCES CITED

The following references are of record in the file of this patent:

UNITED STATES PATENTS

| Number | Name | Date |
| --- | --- | --- |
| 275,329 | Crandall | Apr. 3, 1883 |
| 510,178 | Konig | Dec. 5, 1893 |
| 887,342 | McLane | May 12, 1908 |
| 1,349,775 | Mackintosh | Aug. 17, 1920 |
| 1,613,204 | Smith | Jan. 4, 1927 |
| 2,055,159 | Scofield | Sept. 22, 1936 |